United States Patent

Wells et al.

[15] 3,690,154

[45] Sept. 12, 1972

[54] APPARATUS FOR MEASURING THICKNESS

[72] Inventors: Frank Herbert Wells, Abingdon; Roger Martin, Tilehurst, Reading, both of England

[73] Assignee: United Kingdom Atomic Energy Authority, London, England

[22] Filed: July 17, 1970

[21] Appl. No.: 55,739

[30] Foreign Application Priority Data

July 21, 1969  Great Britain..........36,657/69
Oct. 16, 1969  Great Britain..........50,983/69

[52] U.S. Cl. ................................................73/67.9
[51] Int. Cl. ...........................................G01n 29/04
[58] Field of Search..............................73/67.8, 67.9

[56] References Cited

UNITED STATES PATENTS 3,427,868  2/1969  Charbonnier et al.......73/67.9
3,394,586  7/1968  Cross..........................73/71.5
3,334,622  8/1967  Brech......................73/67.9 X
3,393,331  7/1968  Puckett...................73/67.9 X

*Primary Examiner*—Richard C. Queisser
*Assistant Examiner*—Arthur E. Korkosz
*Attorney*—Larson, Taylor and Hinds

[57] ABSTRACT

Improved accuracy in ultrasonic thickness measurement is achieved by interposing a polystyrene block between the transducer and the metal. The echo signals are then well separated in time from the transmitted signal. Time measurement is made over two or more echo signals, thus eliminating inaccuracies inherent in using the transmitted signal as a time reference.

4 Claims, 16 Drawing Figures

TUNNEL DIODE
CHARACTERISTIC

APPARATUS FOR MEASURING THICKNESS

BACKGROUND OF THE INVENTION

The invention relates to the measurement of thickness.

A number of materials, and in particular metals, are capable of carrying elastic waves which suffer reflections at the surfaces of the material. A technique for determining the thickness of such materials is to measure the time taken by a short pulse of ultrasonic energy to traverse the material thickness and to return after reflection from the remote material surface. The time delay is proportional to the thickness.

SUMMARY OF THE INVENTION

The invention provides apparatus for measuring the thickness of a specimen capable of carrying elastic waves, which apparatus comprises a source of pulsed elastic, preferably ultrasonic, signals, a detector of elastic signals, coupling means for coupling the source and the detector to a specimen, which coupling means is constructed and arranged so that the delay between a transmitted pulse signal and receipt by the detector of the first echo reflected from the specimen surface is greater then the delay between receipt by the detector of successive echoes produced by successive reflections back and forth between the surfaces of the specimen.

Preferably the source and the detector are comprised by a single electro-ultrasonic transducer with associated electrical apparatus respectively for generating electrical signals and supplying the signals to the transducer and for receiving electrical signals detected by the transducer. Preferably the coupling means is such that the delay between a transmitted pulse signal and receipt by the detector of the first echo is at least five times the delay between successive echoes from within the specimen.

It is an important feature of the invention that the coupling means has an impedance to the ultrasonic signals less than one-tenth of the impedance of the material of the specimen.

The apparatus is particularly applicable to the measurement of the thickness of metals and, in this case, it is preferred that the coupling means comprises a polystyrene block interposed between the source and the metal specimen.

BRIEF DESCRIPTION OF THE DRAWINGS

A specific construction of apparatus embodying the invention will now be described by way of example and with reference to the accompanying drawings in which.

DESCRIPTION OF PREFERRED EMBODIMENT

Figure 1:
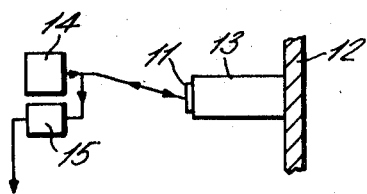
FIG. 1 is a block diagrammatic representation of the apparatus.

In this example, the apparatus is for measurement of metal and in particular steel having a thickness in the range 0.25 cm to 1 cm.

The apparatus comprises an electro-ultrasonic transducer 11 which is coupled to a surface of a metal specimen 12 via a coupling block 13 of polystyrene.

The ultrasonic transducer 11 acts as both transmitter of ultrasonic signal pulses and as receiver of pulses reflected from the metal specimen. The ultrasonic transducer 11 is connected to a generator 14 of electrical signal pulses at the desired ultrasonic frequency and is also coupled to an electrical receiver/amplifier 15 for providing an electrical output signal indicative of the ultrasonic pulse signals received by the transducer 11.

In this example, the metal is steel and the polystyrene has an acoustic impedance which is less than 0.1 of the acoustic impedance of the steel.

Figure 2:
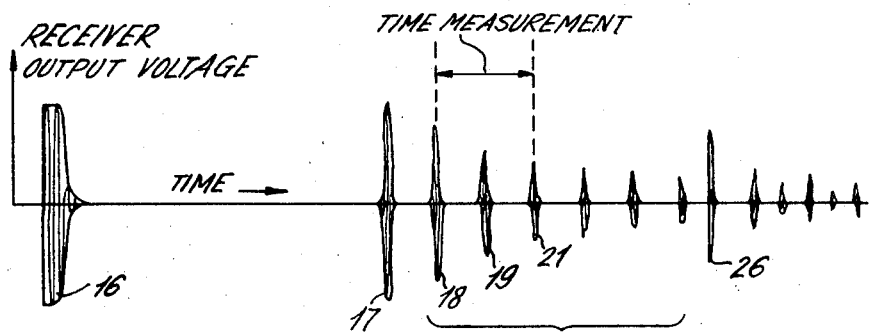
FIG. 2 illustrates the output voltage signals from a receiver coupled to the detector.

Referring to FIG. 2, 16 represents the output from receiver 15 at the moment a transmission pulse is generated. 17 represents the output of receiver 15 derived from the echo from the first metal surface. 18 is the echo from the second metal surface. 19, 21, etc., are successive echoes from the second metal surface after the signal has traversed the specimen width four times, six times, etc., respectively. 26 is the second echo from the front surface of the metal of the signal which has traversed the polystyrene block 13 four times.

The length of the polystyrene block is chosen so that the delay between the transmission pulse 16 and the first echo 17 is at least five times the delay between successive echoes 17, 18, 19.

In this example, time measurement for providing an indication of the thickness of the metal is made by measuring the delay between the echoes marked 18 and 21 in FIG. 2.

If desired, the measurement may be made to start from the first echo 17, but it has been found to be more satisfactory to start from the second echo 18.

Further, measurement over a plurality of the successive echoes gives improved accuracy, the limitation being set by securing an adequate signal amplitude from the later echoes.

The gain of the receiver 15 is controlled so that the amplitude of the echoes being measured is maintained constant in order to improve timing accuracy.

Figure 3:
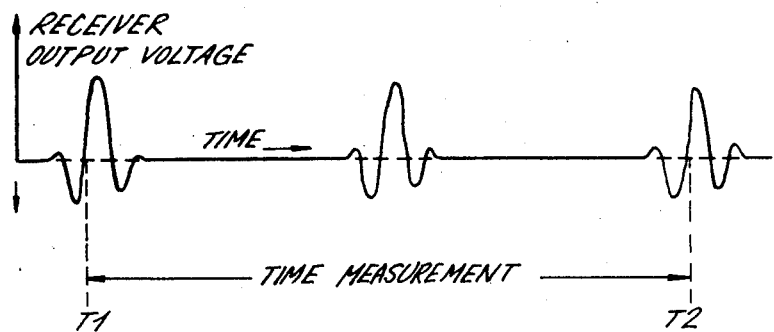
FIG. 3 is a diagrammatic enlargement of part of FIG. 2, FIG. 4 elaborates upon FIG. 1 to show a full block diagram of the electrical apparatus.

The electronic timing of each echo is taken by a zero voltage crossover detection at the first zero voltage crossover following the first major half cycle of voltage waveform. This is illustrated in FIG 3, where time is made between points T1 and T2.

Figure 4:
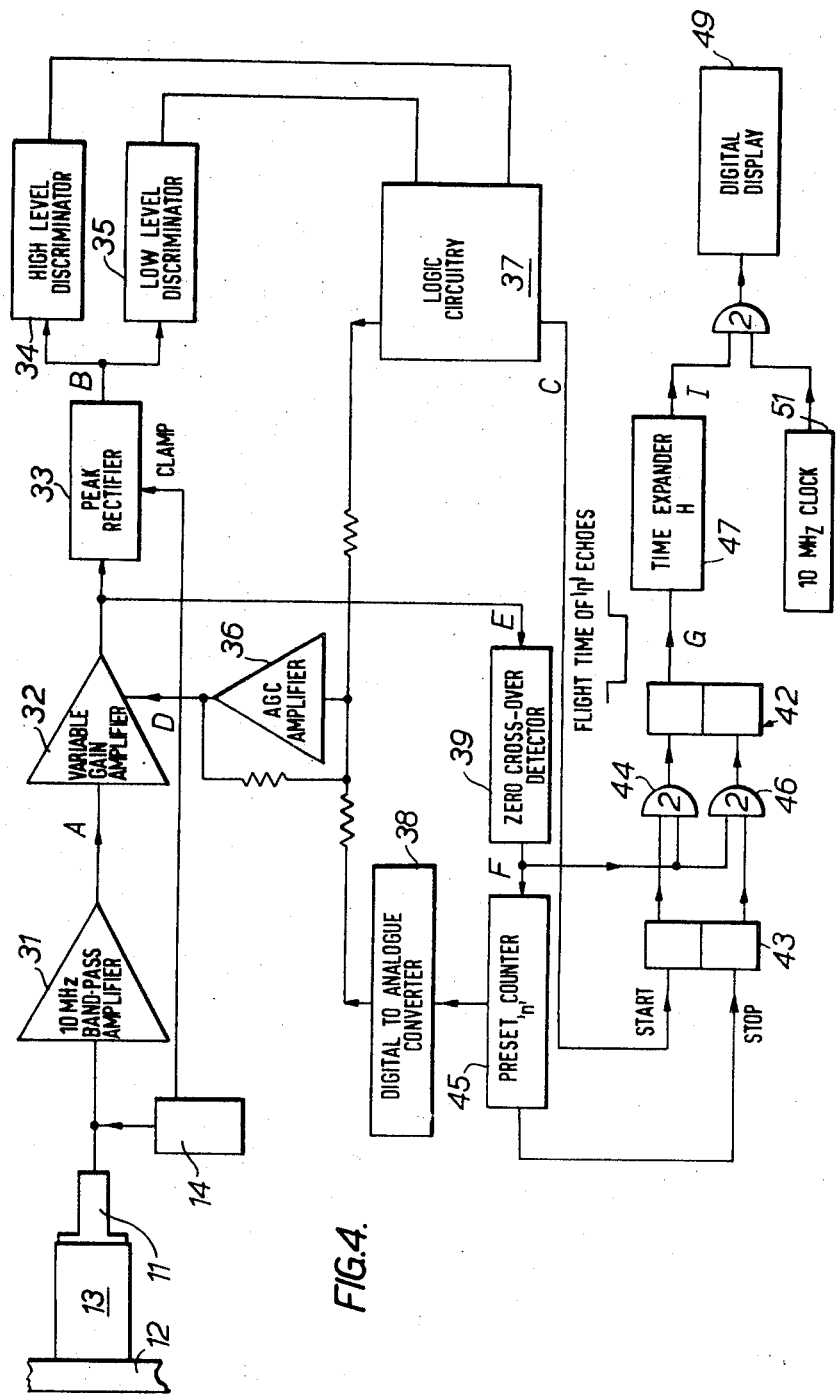

FIG. 4 illustrates the apparatus in more detail.

Figure 5:
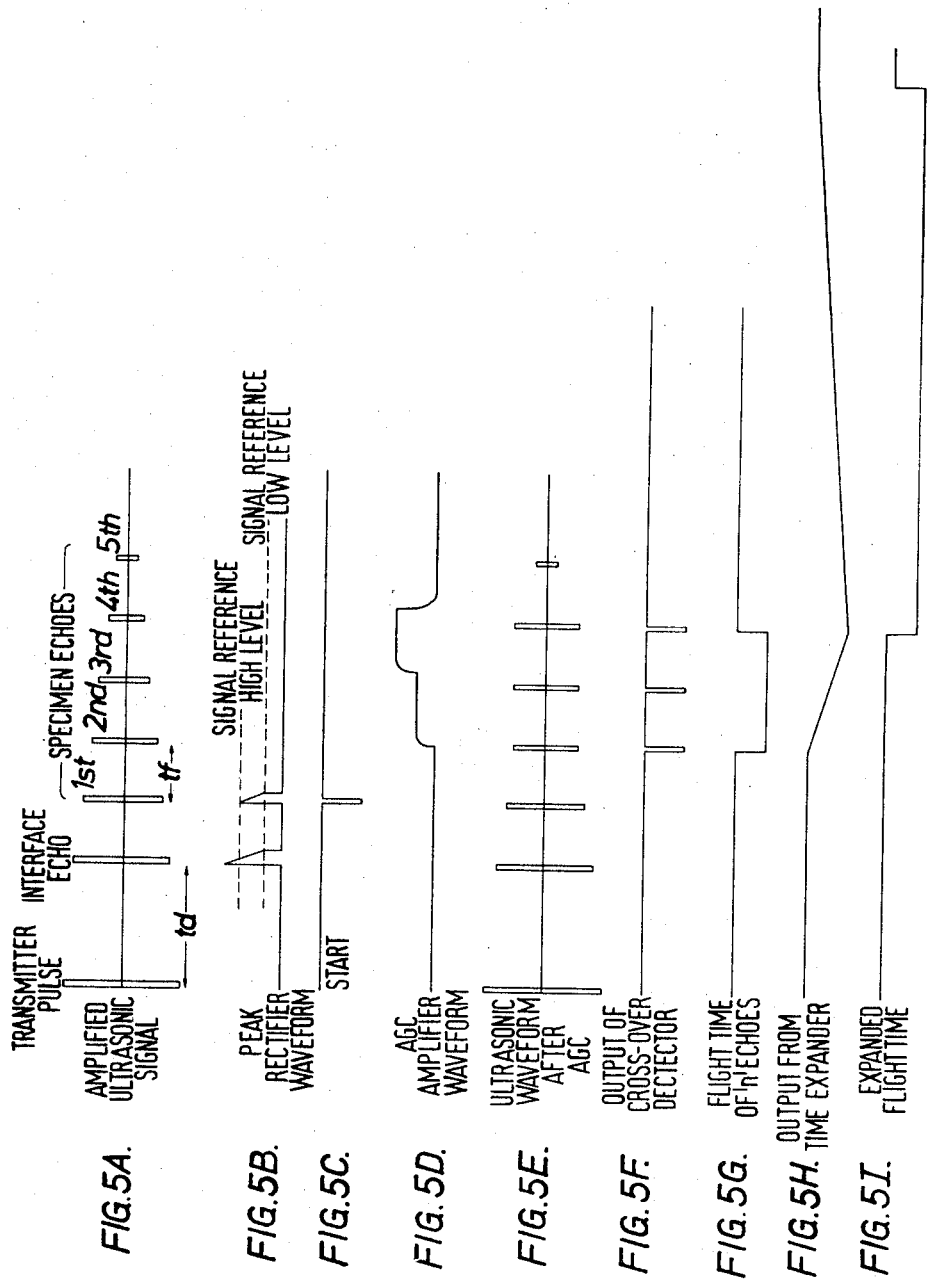
FIGS. 5A to 5I are electrical signal waveform diagrams showing the signal waveforms at the points A to I respectively in FIG. 4.

In FIG. 4, an electro-ultrasonic transducer 11 is shown coupled to a surface of a metal specimen 12 via a coupling block 13 of polystyrene. This arrangement, together with generator 14 of electrical signal pulses, corresponds with FIG. 1. The ultrasonic pulses are generated by rapidly discharging a capacitor, which has been charged to four hundred volts, through a silicon controlled rectifier, thus shock exciting a 10 MHz crystal. The resultant signals are amplified by a 10 MHz bandpass amplifier 31 to give waveform A, FIG. 5A, which is passed to a variable gain amplifier 32 and fed to a peak rectifier 33. The peak rectifier 33 is clamped during the transmitter pulses, so the first signal it sees is the echo from the interface between the specimen 12 and the polystyrene block 13 which exceeds the level of high level discriminator 34 and primes the circuitry in readiness for the first echo from the back surface of the specimen 12. After peak rectification this first echo from the back surface is fed into both the high level discriminator 34 and a low level discriminator 35.

If the signal is between the low and high discrimination levels the overall gain of the system is increased; if the high level is also exceeded the gain is decreased. This gain control is effected by automatic gain control amplifier 36 under the control of logic circuitry 37 for detecting the conditions of the high and low level discriminators 34, 35. Automatic gain control is also effected by the output from a digital to analogue converter 38, in a manner described below.

The apparatus effectively measures the "time of flight" of ultrasonic pulses across the specimen by measuring the delay between successive echoes from the back surface of the specimen.

Figure 6:
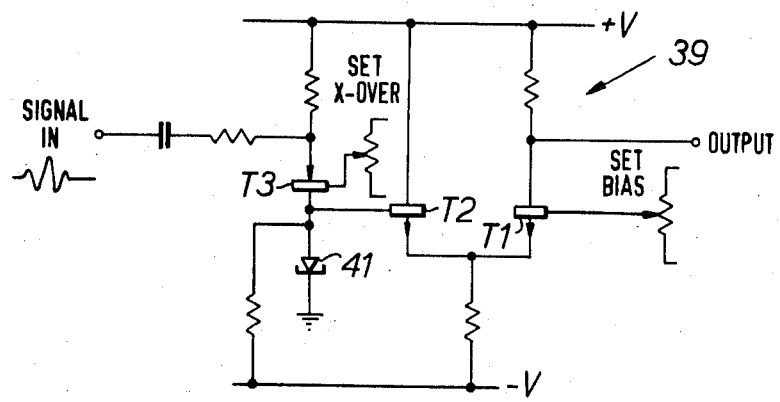
FIG. 6 is an electrical circuit diagram of part of the apparatus.
Figure 7:
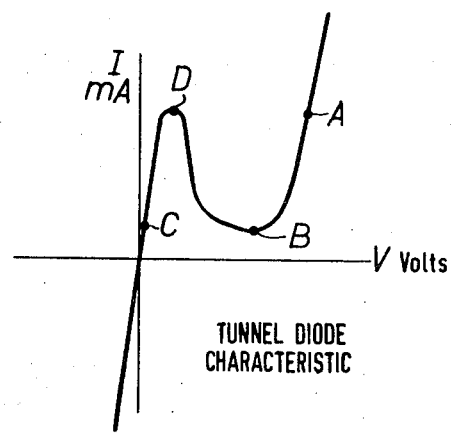
FIG. 7 shows the current-voltage characteristic of a tunnel diode.

A time reference is established on each echo by a zero cross-over detector 39. A schematic of the zero cross-over detector 39 using a tunnel diode 41 is shown in FIG. 6. The tunnel diode 41 is forward biased with current from transistor T3, so that it sits at point 'A' on its characteristic, FIG. 7. A sufficiently large negative excursion of the input signal reduces the forward current through the tunnel diode 41 until it reaches point B, causing the tunnel diode 41 to enter its negative resistance region, flipping to point C, whereupon transistor T1 conducts at the expense of transistor T2. When the input signal starts to go positive, the forward current through the tunnel diode 41 increases, and if the bias current supplied by transistor T3 is correctly chosen it can be arranged for the tunnel diode 41 to reach point D on its characteristic when the input signal passes through zero voltage. At this point the tunnel diode 41 flips back to point A' on its characteristic, causing the current to switch from transistor T1 to transistor T2, the positive edge generated at the collector of transistor T1 being used as the time reference. The first pulse from the zero cross-over detector 39 after the first specimen echo is used to set a bi-stable circuit 42. The bi-stable circuit 42 is reset by a cross-over pulse after a preset number of cross-overs has occurred.

As may be seen from FIG. 4, positive operation of the bi-stable circuit 42 on the required zero cross-overs is secured with the help of a second bi-stable circuit 43. Thus the second bi-stable circuit 43 is set by a signal from logic circuitry 37 upon receipt of the first echo from the back surface of the specimen. The output from the set bi-stable circuit 43 is combined by AND gate 44 with the output from the zero cross-over detector 39 to give an unambiguous timed setting signal for bi-stable circuit 42.

The second bi-stable circuit 43 is reset by a signal output from a preset counter 45 and the consequent output is combined by AND gate 46 with the output from the zero cross-over detector 39 to give an unambiguous timed resetting signal for the bi-stable circuit 42.

By measuring the time of flight over a number of echoes a better accuracy is obtained. The number of echoes used depends upon the quality of the ultrasonic signal; measurement of two is usually possible but in favorable cases the measurement may be over four echoes. The output from the preset counter 45 used to count the number of crossover pulses is decoded by the digital converter 38 to provide an automatic gain control signal (waveform FIG. 5D) to bring to the same level the amplitude of the echoes used in the crossover measurement. Although the time reference produced by the tunnel diode zero cross-over detector is independent of the amplitude of the input signal, by stabilizing the input amplitude the threshold of the cross-over detectors can be set higher than otherwise, making sure that it is clear of any clutter on the base line that could give rise to spurious cross-over pulses.

Figure 8:
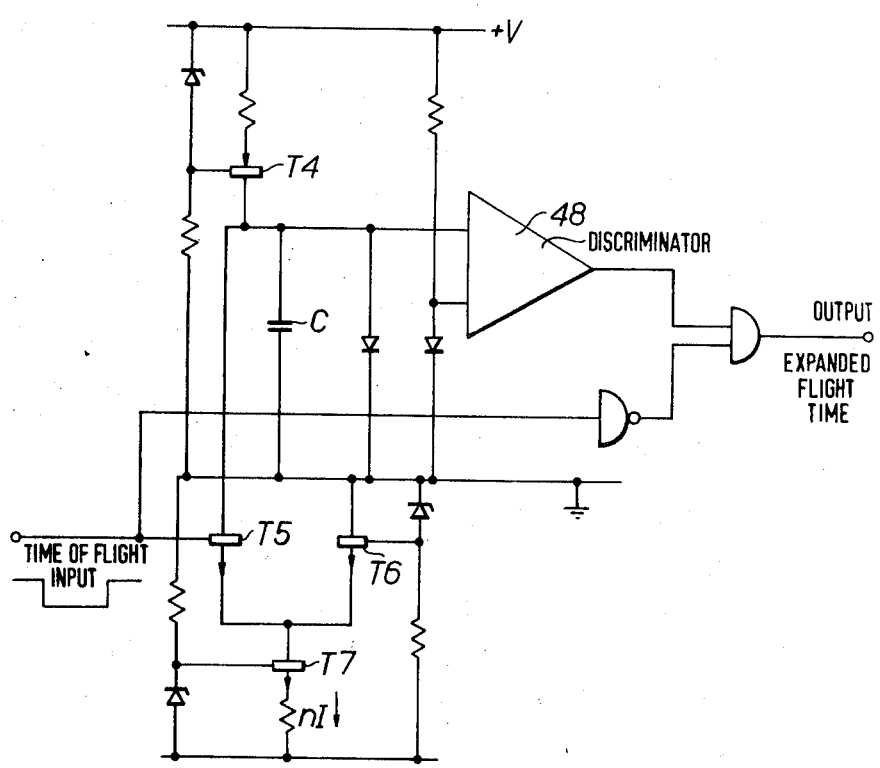
FIG. 8 is an electrical circuit diagram of another part of the apparatus.

The time of flight information produced by the cross-over detector is only a few microseconds long, and to digitise this would require a clock frequency of hundreds of mega-herz for the quantitive error to be equivalent to, say, 0.0003 cms. For example, the flight time over two echoes for mild steel 0.3000 cms thick is approximately 1.7 microseconds. A clock frequency of 600 MHz would be required for a resolution of 0.0003 cms in the least significant digit. To make the clock frequency more reasonable (10 MHz) the time of flight pulse from the crossover detector is multiplied in an analogue time expander circuit 47 shown in FIG. 8. The time of flight pulse is used to switch a current defined by transistor 77 from transistor T6 to T5. Capacitor C is discharged negatively until the end of the time of flight pulse, the amount of charge deposited being proportional to the time of flight. Capacitor C is recharged by a constant current defined by transistor T4 (waveform, FIG. 5H), and when the voltage on the capacitor returns to its original level a discriminator 48, whose output (waveform, FIG. 5I) switched from the high to the low state at the beginning of the time of flight pulse, returns to the high state. The ratio between the discharge and recharge time of the capacitor C is the ratio between the discharge and recharge currents, By subtracting the time of flight from the discriminator output a pulse whose duration equals the recharge time is obtained, and is equal to time of flight times the ratio between the discharge and recharge currents. For mild steel measuring over two echoes using a clock frequency of 10 MHz an expansion of sixty times is necessary for a resolution of 0.0003 cms. Calibration of the instrument may be effected by changing the expansion ratio to allow for the differences in the velocity of propagation of ultrasound from one material to another.

Thickness in the range 0.2000 cms to 2.0000 cms can be measured to a precision of 0.0003 cms. The lower limit is set by the width of ultrasonic echo obtained using a 10 MHz crystal and the upper by the dynamic range of the time expanded. The upper limit is not fundamental and can easily be extended, the ultimate limit being governed by the attenuation of acoustic delay, since this delay has to be long enough to contain at least three reverberations (for the case where the time of flight data is measured between adjacent echoes) within the specimen before the second interface echo. The low limit may be extended by using a higher frequency crystal.

A digital output at 49, FIG. 4, is obtained by gating a 10 MHz clock 51 with the time expander output. The digital output is suitable for a straight numerical display, or may be fed to some digital data handling device. If a human operator is expected to interpret the data this may not be easy, especially if the data is changing rapidly as the work piece is scanned. To overcome this difficulty a combined digital analogue display using a preset scaller and a null reading meter may be employed. The preset scaler is used to determine a time interval by counting clock pulses until a preset number have occurred. The number of pulses is defined by a four decade thumb wheel switch. The time interval generated by the scaler is compared with the output of the time expander in an exclusive OR circuit. The output of the exclusive OR is the algebraic sum of the two waveforms and is arranged to drive, through an integrater, a center zero meter. When the two waveforms are of the same length the output from the integrater is zero, but if they differ the meter is deflected from zero in a positive direction if the time expander waveform is longer than the preset scaler time interval, and vice versa. It can be seen that when the meter reads zero the thickness is given by the number of clock pulses counted by the preset scaler, i.e. the number displayed in the thumb wheel switches. The meter deflection may be calibrated to display the variation in thickness from some mean thickness, set on the preset scaler, as the workpiece is scanned. Alternatively, the meter may be damped with a suitable time constant, so that the mean thickness may be measured as a given area of the work piece is repeatedly scanned. This form of display is well suited to on-line measurement, as the operator has only to set his required thickness on the preset scaler and machine the work piece until the meter reads zero.

As with all ultrasonic measuring devices, a good coupling bond between the ultrasonic probe and the work piece is required if sufficient ultrasonic energy is to be transmitted into the work piece. As the thickness gauge described above requires an acoustic delay between the ultrasonic probe and the work piece, a fluid couplant can be used, thus easing the problems of scanning. In the foregoing example, variations in this acoustic delay as the work piece is scanned have no effect on the measurement. This is one aspect of an important general advantage of the apparatus, namely that the transmission pulse is not used as a reference in the timing so that inaccuracies due to the transducer and coupling of the transducer to the specimen surface are avoided. Fortunately, in cases where on-line measurement is made while the specimen is being machined, there is usually plenty of cutting fluid flowing around that can be used as the coupling between the probe and work piece. The automatic gain control minimizes variations in signal strength due to changes in the efficiency of the coupling as the work piece is scanned, and the automatic gain control waveform may be monitored, and an indication given whenever the ultrasonic signal is within acceptable limits for satisfactory operation.

Having a copious supply of cutting fluid to act as a couplant is an advantage, but it can also be an embarrassment if it gets in contact with the face of the specimen remote from the ultrasonic probe. Couplant on this rear face can affect the returning echo, giving rise to false time of flight data. A simple method of overcoming this problem is to direct a jet of air on to the rear surface to blow away any cutting fluid that tries to accumulate.

The invention is not restricted to the details of the foregoing example.

We claim:

1. Apparatus for measuring the thickness of a specimen capable of carrying elastic waves, which apparatus comprises: a source of pulsed elastic signals, a detector of elastic signals, coupling means for coupling the source and the detector to a specimen and for introducing a delay between a transmitted pulse signal and receipt by the detector of the first echo reflected from the specimen surface, the delay between a transmitted pulse signal and receipt by the detector of the first echo being at lest five times greater than the delay between receipt by the detector of successive echoes produced by successive reflections back and forth between the surfaces of the specimen, and measuring means coupled to the output of the detector for measuring the delay between successive echoes from the back surface of the specimen including a zero crossover detector for establishing a time reference on each echo signal.

2. Apparatus as claimed in claim 1, wherein the coupling means has an impedance to the elastic signals less than one-tenth of the impedance of the material of the specimen.

3. Apparatus as claimed in claim 1, further comprising a present counter connected for counting the output signals from the zero cross-over detector, and a bi-stable circuit connected to the zero cross-over detector and the preset counter, the bi-stable circuit being switched upon detection of the first echo and reset upon detection of the "$n$"th echo as determined by the setting of the preset counter, whereby the duration of the signal output of the bi-stable circuit is proportional to the time of flight of "$n$" echoes.

4. Apparatus as claimed in claim 3, further comprising a time expanding circuit, to which the signal output of the bi-stable circuit is supplied, a clock pulse generator and means for counting clock pulses over the duration of the time expanded signal output.

* * * * *